US008385728B2

(12) United States Patent
Chung

(10) Patent No.: US 8,385,728 B2
(45) Date of Patent: Feb. 26, 2013

(54) APPARATUS AND METHOD FOR SEARCHING START POSITION OF BROADCASTING PROGRAM

(75) Inventor: Dong Chul Chung, Seoul (KR)

(73) Assignee: Humax Co., Ltd., Yongin-si (KR)

( * ) Notice: Subject to any disclaimer, the term of this patent is extended or adjusted under 35 U.S.C. 154(b) by 1505 days.

(21) Appl. No.: 11/337,813

(22) Filed: Jan. 24, 2006

(65) Prior Publication Data

US 2006/0190976 A1  Aug. 24, 2006

(30) Foreign Application Priority Data

Jan. 24, 2005  (KR) .................. 10-2005-0006331

(51) Int. Cl.
| | |
|---|---|
| *H04N 5/783* | (2006.01) |
| *H04N 5/44* | (2011.01) |
| *H04N 5/76* | (2006.01) |
| *H04N 5/78* | (2006.01) |
| *H04N 5/92* | (2006.01) |
| *H04N 5/445* | (2011.01) |
| *H04N 5/765* | (2006.01) |
| *H04N 5/7824* | (2006.01) |
| *H04N 7/00* | (2011.01) |
| *H04N 7/167* | (2011.01) |
| *H04N 7/173* | (2011.01) |
| *H04N 9/80* | (2006.01) |
| *G06F 15/16* | (2006.01) |
| *G06F 17/00* | (2006.01) |
| *G11B 5/02* | (2006.01) |
| *G11B 19/02* | (2006.01) |

(52) U.S. Cl. ........ 386/350; 386/200; 386/241; 386/243; 386/244; 386/247; 386/253; 386/262; 386/293; 386/296; 386/297; 386/298; 386/318; 386/324; 348/460; 348/476; 348/553; 360/27; 360/69; 360/72.2; 380/241; 700/234; 709/219; 725/40; 725/41; 725/43; 725/52; 725/55; 725/58; 725/88; 725/89

(58) Field of Classification Search ............. 386/68, 386/46, E5.024, 83, E5.001, E5.042, E5.043, 386/E5.071, 241, 243, 244, 247, 253, 262, 386/296, 297, 298, 318, 324, E5.002; 348/E5.102, 348/E5.105, E5.108, E5.043, 476, E7.056, 348/E7.06, E7.076, 460, 553, E5.104, E5.112, 348/E7.036; 360/69, 27, 72.2; 700/234; 709/219; 725/40, 43, 52, 58, 88, 89, 34, 725/133, 141, 55, 41; 380/241; G9B/19.005, G9B/19.017, 20.012, 20.014, 15.002, 15.003, G9B/15.004, 15.009, 15.011, 23.064, 23.088, G9B/23.091, 27.099, 27.002, 27.021
See application file for complete search history.

(56) References Cited

U.S. PATENT DOCUMENTS 4,536,791 A * 8/1985 Campbell et al. ............. 725/28
5,166,886 A * 11/1992 Molnar et al. ................ 700/234
(Continued)

FOREIGN PATENT DOCUMENTS

| EP | 0 399 853 A2 | 11/1990 |
|---|---|---|
| EP | 1 037 211 A2 | 9/2000 |
| EP | 1 102 275 A2 | 5/2001 |

OTHER PUBLICATIONS

European Search Report dated Jul. 18, 2011.

*Primary Examiner* — Thai Tran
*Assistant Examiner* — Syed Hasan
(74) *Attorney, Agent, or Firm* — KED & Associates LLP

(57) ABSTRACT

Provided are an apparatus and method for searching a start position of a broadcast program. According to an embodiment of the present invention, a received broadcast program is recorded in a recording medium while being output as video and audio. If a new broadcast program is started, position information regarding a start part of the new broadcast program is stored in a memory. Thus, a current broadcast program is reproduced from a start part by searching a start position of the current broadcast program recorded in the recording medium with reference to stored position information. A determination on whether the new broadcast program is started is done on the basis of Electronic Program Guide (EPG) information or a change in audio and video signals. Accordingly, it is possible to quickly search and reproduce a start part of a broadcast program which is currently recorded.

9 Claims, 5 Drawing Sheets

U.S. PATENT DOCUMENTS

| | | | | |
|---|---|---|---|---|
| 5,488,409 | A * | 1/1996 | Yuen et al. | 725/41 |
| 6,775,085 | B2 * | 8/2004 | Saito et al. | 360/69 |
| 6,957,386 | B2 * | 10/2005 | Nishina et al. | 715/716 |
| 7,046,913 | B1 * | 5/2006 | Sato | 386/291 |
| 7,286,744 | B2 * | 10/2007 | Tada | 386/351 |
| 7,426,332 | B2 * | 9/2008 | Kanehira | 386/291 |
| 7,433,579 | B2 * | 10/2008 | Arishima | 386/341 |
| 2002/0080277 | A1 * | 6/2002 | Kida et al. | 348/553 |
| 2002/0109930 | A1 * | 8/2002 | Saito et al. | 360/69 |
| 2003/0202773 | A1 | 10/2003 | Dow et al. | |
| 2003/0215216 | A1 * | 11/2003 | Hashimoto et al. | 386/68 |
| 2004/0078818 | A1 | 4/2004 | Hong | |

* cited by examiner

APPARATUS AND METHOD FOR SEARCHING START POSITION OF BROADCASTING PROGRAM

BACKGROUND OF THE INVENTION

1. Field of the Invention

The present invention relates to a method and apparatus for searching a start position of a broadcast program, and more particularly, to an apparatus and method for searching a start position of a broadcast program which is recorded in a recording medium.

2. Description of the Related Art

Digital broadcast receivers, such as a set top box (STB), for receiving digital broadcasts are widely popularized. Recently, a digital broadcast receiver having a Personal Video Recording (PVR) function which is capable of recording broadcast programs in a recording medium such as a hard disc drive (HDD), is developed and popularized.

The digital broadcast receiver, as illustrated in FIG. 1, includes a tuner 10, a signal processor 11, a MPEG decoder 12, a microprocessor 13, an OSD generator 14, a memory 15, a HDR (HDD Recording) system 16, a hard disc (HDD), etc.

The microprocessor 13 controls the tuner 10 to select an arbitrary broadcast channel according to a user's request, and controls the signal processor 11 and the MPEG decoder 12 to output a broadcast program received through the broadcast channel as audio and video.

Also, the microprocessor 13 controls the HDR system 16 to record, in real time, a broadcast program being received in the HDD 17, according to a user's request.

In the HDD 17, as illustrated in FIG. 2, a header area, a File Allocation Table (FAT) area, and a data area are divided and allocated.

When recording broadcast programs in the data area of the HDD 17, the microprocessor 13 creates first, second, and third program information Program#1_Info, Program#2_Info, and Program#3_Info respectively corresponding to first, second, and third broadcast programs Program#1, Program#2, and Program#3 sequentially recorded, and records the first, second, and third program information Program#1_Info, Program#2_Info, and Program#3_Info in the FAT area. The first, second, and third program information Program#1_Info, Program#2_Info, and Program#3_Info include addresses Add# of data sections in which the respective programs are recorded, data sizes, reproduction times, etc.

If a user requests reproduction of an arbitrary broadcast program, for example, the third broadcast program Program#3, the microprocessor 13 reproduces the third broadcast program Program#3 from its recording start position with reference to a start address Add# included in the corresponding third program information Program#3_Info.

However, a digital broadcast receiver having a general PVR function creates the corresponding program information and records it in a FAT area after a data recording operation of recording a broadcast program in a HDD is terminated. Accordingly, when a user requests reproduction of a start part of a broadcast program which is received and recorded in real time, it is difficult to quickly search a recording position corresponding to the start part of the broadcast program.

Also, although a broadcast program which is received and recorded in real time changes to a new broadcast program while a data recording operation is performed, the digital broadcast receiver manages only the recording position of the broadcast program received when the data recording operation has been started, without separately managing a recording position of the new broadcast program. Accordingly, it is difficult to quickly search a recording position corresponding to a start part of a broadcast program which a user currently listens and views.

SUMMARY OF THE INVENTION

To resolve the problem described above, there is provided a method for quickly searching a start position of a broadcast program which is currently recorded.

Accordingly to an aspect of the present invention, there is provided a method for searching a start position of a broadcast program, including: when a new broadcast program is started while recording a broadcast program which is received and output as audio and video in a recording medium, storing position information regarding a start part of the new broadcast program; and searching and reproducing a start part of a current broadcast program recorded in the recording medium with reference to the position information.

According to another aspect of the present invention, there is provided an apparatus for searching a start position of a broadcast program, including: a signal processor outputting a received broadcast program as audio and video; a recording unit recording the broadcast program in a recording medium; a detection unit detecting whether a new broadcast program is started; a memory storing position information regarding a start part of a broadcast program; and a control unit storing position information regarding a start part of the new broadcast program in the memory if the new broadcast program is started, and searching and reproducing the start part of the new broadcast program recorded in the recording medium with reference to the position information.

Preferably, a determination on whether the new broadcast program is started is done on the basis of Electronic Program Guide (EPG) information or a change in audio and video signals.

Preferably, if a position at which data of a current broadcast program is recorded is identical to position information of a different broadcast program stored in the memory, the position information of the different broadcast program is deleted.

Preferably, the position information is divided and stored for each broadcast program.

DETAILED DESCRIPTION OF PREFERRED EMBODIMENTS

Hereinafter, an apparatus and method for searching a start position of a broadcast program, according to the present invention, will be described in detail with reference to the appended drawings.

Figure 1:
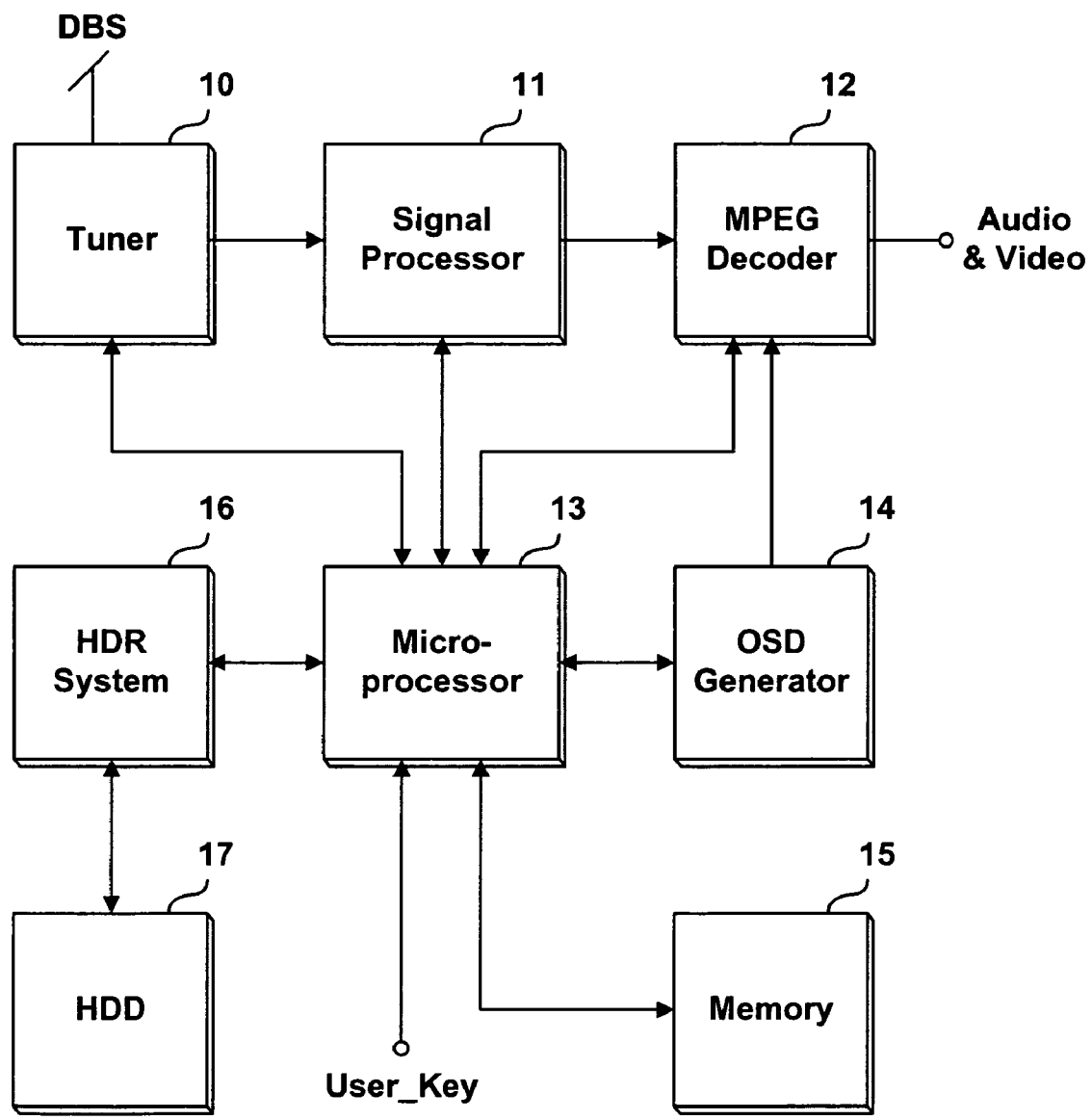
FIG. 1 is a block diagram of a digital broadcast receiver having a general Personal Video Recording (PVR) function.
Figure 2:
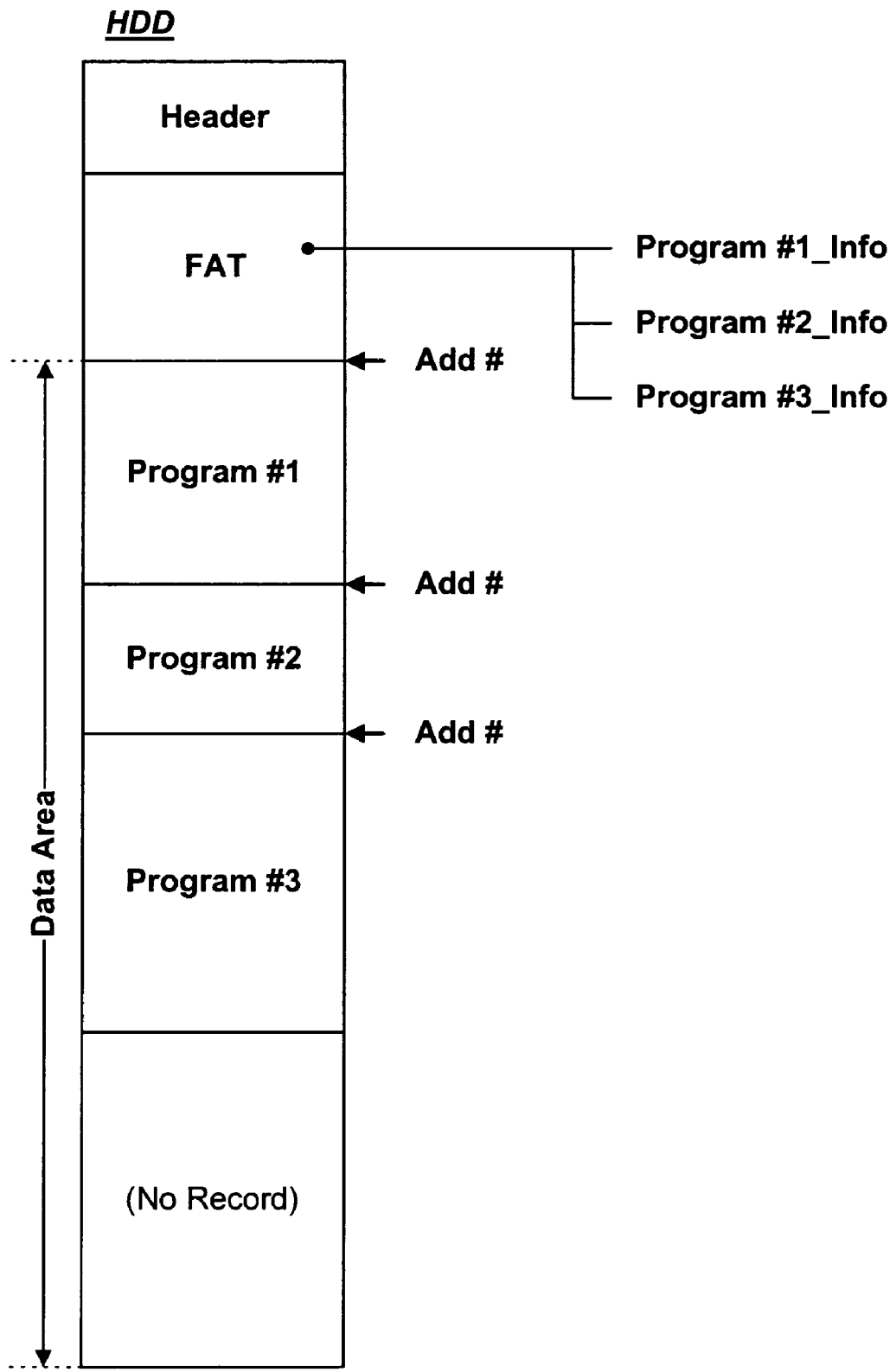
FIG. 2 illustrates an embodiment in which broadcast programs are recorded and managed in a hard disc (HDD) of the digital broadcast receiver having the general PVR function.
Figure 3:
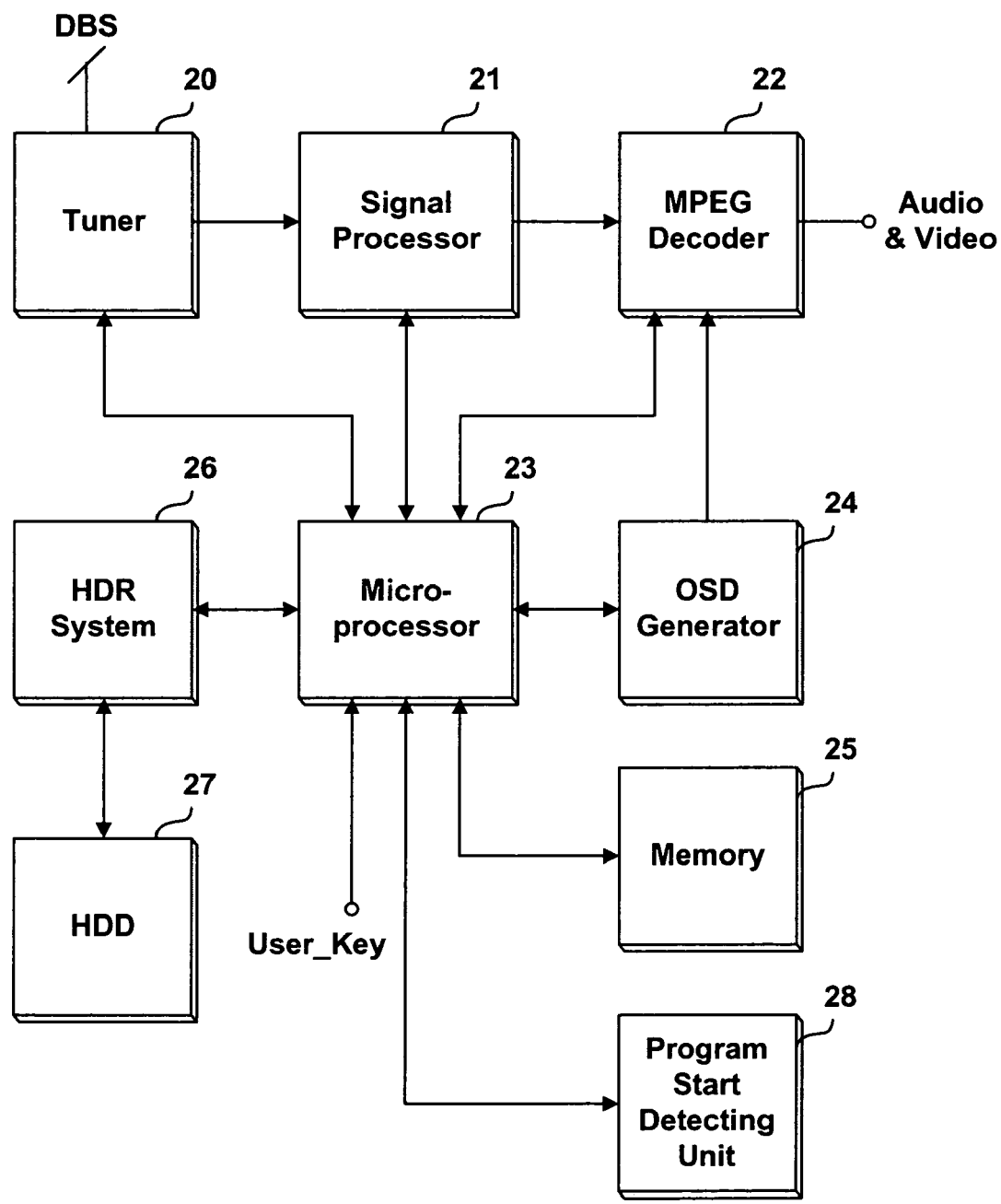
FIG. 3 is a block diagram of a digital broadcast receiver having a PVR function, according to an embodiment of the present invention.

Referring to FIG. 3, a digital broadcast receiver, such as a set top box, a TV, etc., having a Personal Video Recording (PVR) function, to which the present invention is applied, includes a tuner 20, a signal processor 21, a MPEG decoder 22, a microprocessor 23, an OSD generator 24, a memory 25, a HDR system 26, and a hard disc (HDD). The digital broadcast receiver can further include a program start detecting unit 28.

The program start detecting unit 28 detects whether a broadcast program which is received in real time changes to a new broadcast program. The program start detecting unit 28 detects whether a broadcast program which is currently received changes to a new broadcast program, for example, with reference to Electronic Program Guide (EPG) information additionally provided through a digital broadcast.

Alternatively, the program start detecting unit 28 can detect whether the broadcast program changes according to a change in video and audio signals appearing between broadcast programs. For example, if a video period of a black screen and an audio period of no sound are simultaneously detected for a predetermined time, the program start detecting unit 28 determines that the broadcast program which is received in real time changes to a new broadcast program.

The microprocessor 23 controls the tuner 20 to select an arbitrary broadcast channel according to a user's request, and controls the signal processor 21 and the MPEG decoder 22 to output a broadcast program received through the broadcast channel as audio and video.

Also, the microprocessor 23 controls the HDR system 26 to record the broadcast program which is received in real time in the HDD 27, according to a user's request.

Figure 4:
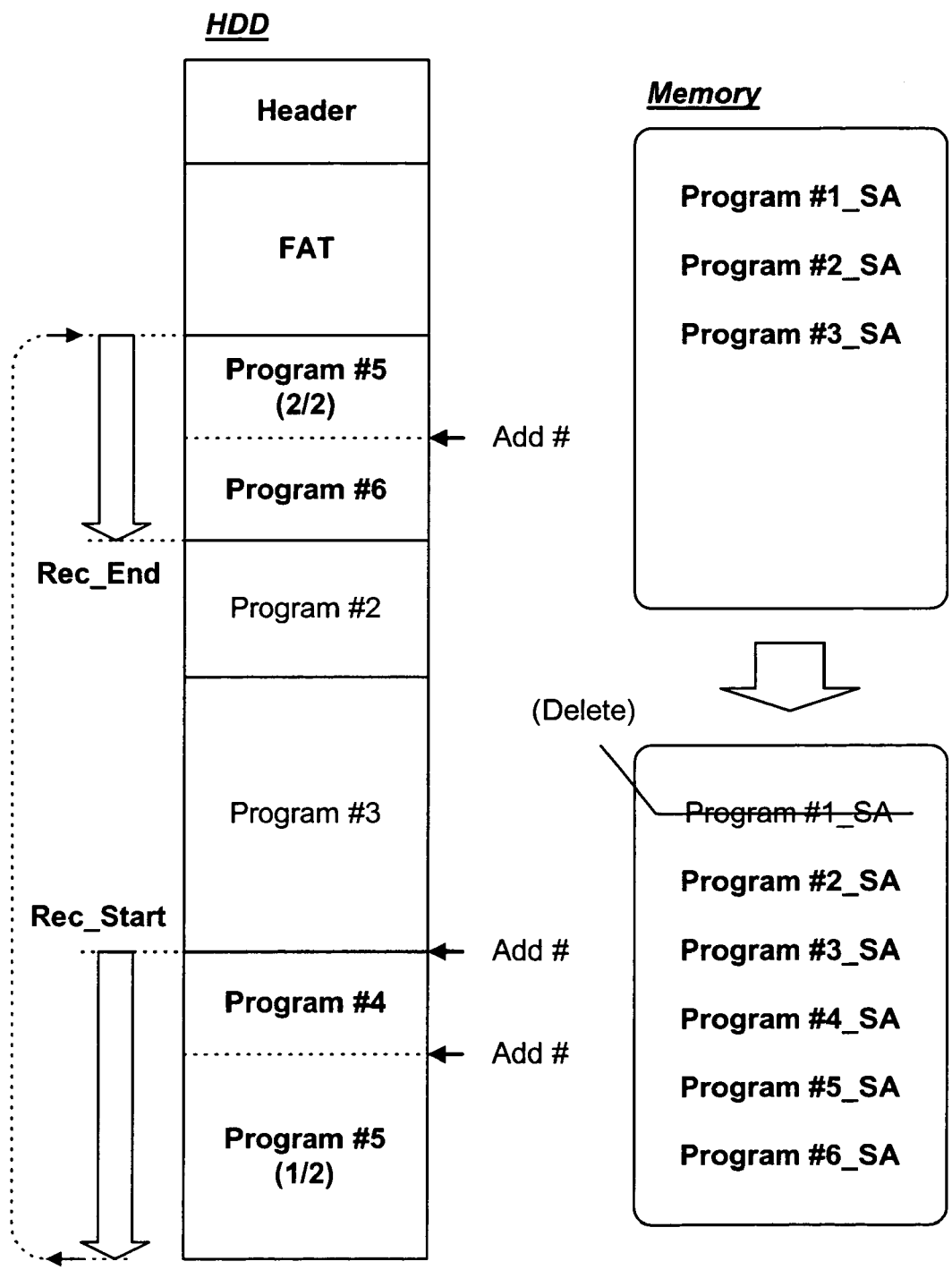
FIG. 4 illustrates an embodiment in which broadcast programs are recorded and managed in a HDD of the digital broadcast receiver having the PVR function according to the embodiment of the present invention.

For example, as illustrated in FIG. 4, when a new fourth broadcast program Program#4 is recorded in the state where first, second, and third programs Program#1, Program#2, and Program#3 are recorded in a data area of the HDD 27, the microprocessor 23 temporarily stores recording start position information Program#4_SA of the fourth broadcast program Program#4 being currently recorded, separately, in the memory 25, in addition to recording start position information Program#1_SA, Program#2_SA, and Program#3_SA corresponding to the first, second, and third broadcast programs Program#1, Program#2, and Program#3.

Thereafter, if the program start detecting unit 28 detects that a new broadcast program, for example, a fifth broadcast program Program#5 is received, the microprocessor 23 stores recording start position information Program#5_SA of the fifth program Program#5 in the memory 25.

Then, as illustrated in FIG. 4, if the fifth broadcast program Program#5 is overwritten on the data section in which the first broadcast program Program#1 is recorded, the microprocessor 23 deletes the recording start position information Program#1_SA of the first broadcast program Program#1 stored in the memory 25 in real time.

Also, if the program start detecting unit 28 detects that a sixth broadcast program Program#6 is received, the microprocessor 23 stores recording start position information Program#6_SA of the sixth broadcast program Program#6 in the memory 25. Accordingly, when a user requests reproduction of a start part of the sixth broadcast program Program#6 which he or she currently listens and views, the sixth broadcast program Program#6 can be quickly reproduced from its recording start position using the recording start position information Program#6_SA of the sixth broadcast program Program#6 stored in the memory 25.

Figure 5:
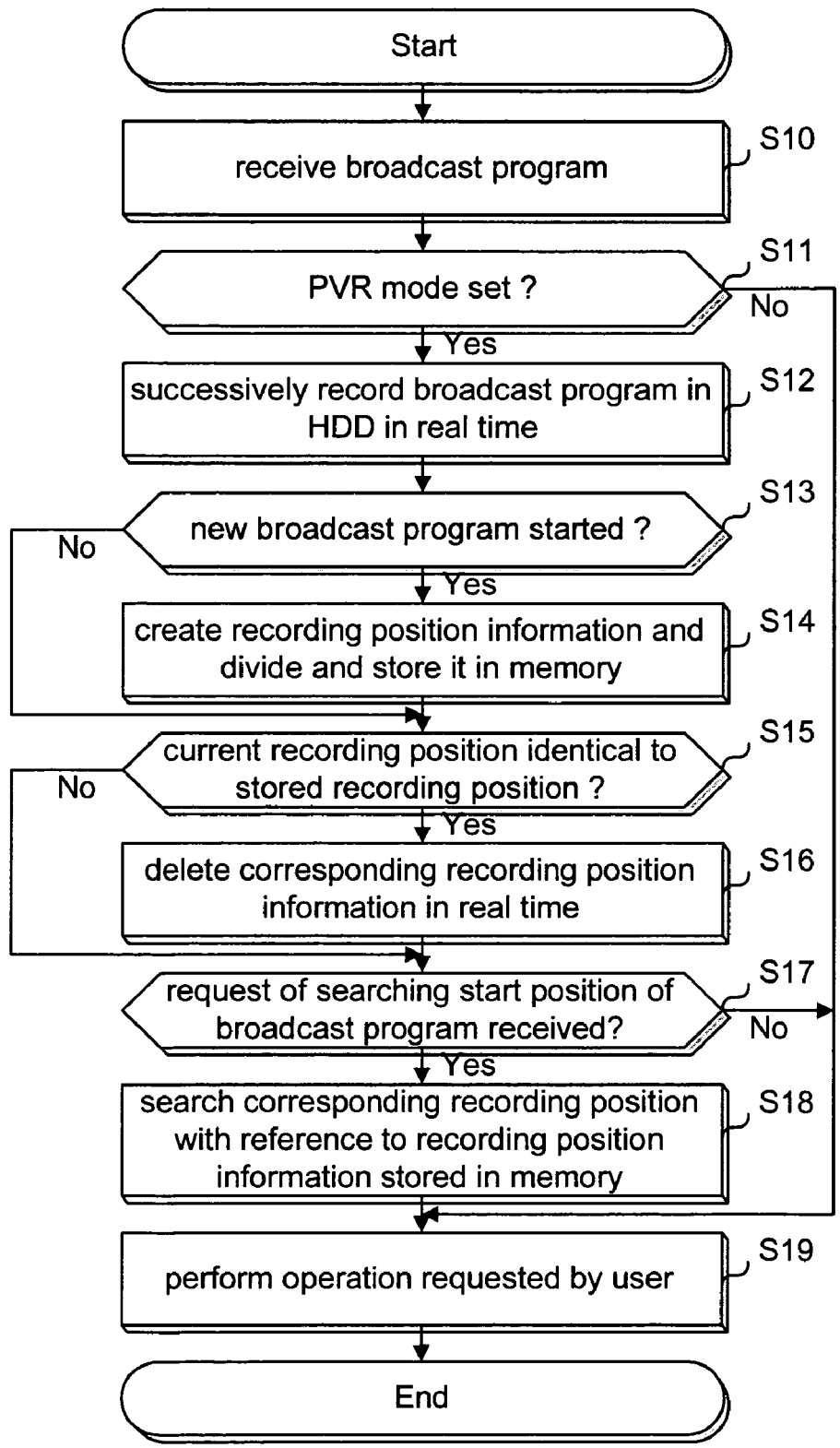
FIG. 5 is a flowchart illustrating a method for searching a start position of a broadcast program, according to an embodiment of the present invention.

FIG. 5 is a flowchart illustrating a method for searching a start position of a broadcast program, according to an embodiment of the present invention.

The microprocessor 23 controls the tuner 20 to select an arbitrary broadcast channel, and controls the signal processor 21 and the MPEG decoder 22 to output a broadcast program received through the broadcast channel as audio and video (operation S10).

Meanwhile, if a PVR mode is set by a user (operation S11), the microprocessor 23 controls the HDR system 26 to record the received broadcast program in the HDD 27 in real time (operation S12), and the program start detecting unit 28 detects whether a new broadcast program is started with reference to EPG information or a change in video and audio signals, etc.

If the programs start detecting unit 28 detects that a new broadcast program is started (operation S13), the microprocessor 23 stores recording start position information of the new broadcast program to be recorded in the HDD 27, separately, in the memory 25 (operation S14). For example, as described above with reference to FIG. 4, the memory 25 stores recording start position information Program#4_SA of a fourth broadcast program #4, in addition to recording start position information Program#1_SA, Program#2_SA, and Program#3_SA of first, second, and third broadcast programs Program#1, Program#2, and Program#3.

Then, the microprocessor 23 compares the current recording position with recording position information stored in the memory 25 (operation S15). For example, as described above with reference to FIG. 4, if a fifth broadcast program Program#5 is overwritten on the data section in which the first broadcast program Program#1 is recorded, the current recording position is identical to the recording start position information Program#1_SA of the first broadcast program Program#1. In this case, the microprocessor 23 deletes the recording start position information Program#1_SA of the first broadcast program Program#1 stored in the memory 25 in real time (operation S16).

If a user requests an operation of searching a start position of a current broadcast program, for example, a sixth broadcast program Program#6 while listening and viewing the broadcast program Program#6 (operation S17), the microprocessor 23 reproduces the sixth broadcast program Program#6 from its start part recorded in the corresponding recording position, with reference to recording start position information Program#6_SA of the sixth broadcast program Program#6 stored in the memory 25 (operation S18). Then, the microprocessor 23 performs an operation requested by the user (operation S19). Accordingly, it is possible to quickly search and reproduce the start part of a broadcast program updated and recorded in the HDD 27.

Accordingly, it is possible to quickly search and reproduce a start part of a broadcast program which is currently recorded.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for searching a start position of a broadcast program, comprising:

recording a video signal that includes a first broadcast program and a second broadcast program, wherein the first broadcast program changes to the second broadcast program during recording of the video signal;

automatically detecting the start of the second broadcast program during recording of the video signal;

when or after the second broadcast program starts, storing in a memory position information corresponding to a start part of the second broadcast program being recorded on a hard disk, wherein:
- (a) the position information in the memory includes an address corresponding to the start part of the second broadcast program, the position information of the start part of the second broadcast program stored separately from position information including an address corresponding to a start part of the first broadcast program, and
- (b) the start of the second broadcast program is automatically detected based on Electronic Program Guide (EPG) information or a change in at least one of audio or video corresponding to the video signal;

searching the memory for the position information for the second broadcast program while the second broadcast program is being recorded on the hard disk; and reproducing the second broadcast program from the address which corresponds to the start part in the hard disk indicated by the searched position information, said searching and reproducing being performed before the recording of the video signal has ended, wherein the method further comprising:

if a position in the hard disk at which data of the second broadcast program is recorded is identical to position information of a third broadcast program previously stored in the memory, deleting the position information of the third broadcast program, wherein the position information in the memory corresponding to the third broadcast program includes a start address of the third broadcast program.

2. The method according to claim 1, wherein position information is divided and stored in the memory for each of a plurality of broadcast programs including the first and second broadcast programs.

3. The method according to claim 1, wherein the change in at least one of said audio or video signals is detected based on a video period of a substantially black screen and an audio period of substantially no sound simultaneously detected for a predetermined time.

4. The method according to claim 1, wherein the first and second programs are received through a same tuner.

5. An apparatus for searching a start position of a broadcast program, comprising:
a controller;
a signal processor outputting a first broadcast program as audio and video;
a recording unit performing a recording operation of a video signal, that includes the first broadcast program and a second broadcast program, on a hard disk, wherein the first broadcast program changes to the second broadcast program during recording of the video signal;
a detector to automatically detect the start of the second broadcast program during the recording operation, said detecting performed based on Electronic Program Guide (EPG) information or a change in at least one of audio or video signals; and
a memory storing position information including addresses for a corresponding number of start parts of a plurality of broadcast programs recorded on the hard disk, the plurality of broadcast programs including the first and second broadcast programs;
wherein if the detector detects that the second broadcast program has started during the recording operation, the controller controls the memory to store position information including the address corresponding to the start part of the second broadcast program being recorded on the hard disk,
wherein the controller further:
searches the memory for the position information including the address corresponding to the start part of the second broadcast program that is being recorded on the hard disk, and
reproduces the second broadcast program from the address corresponding to the start part of second broadcast program that is being recorded on the hard disk with reference to the searched position information,
wherein, if a position in the hard disk at which data of the second broadcast program is recorded is identical to position information of a third broadcast program previously stored in the memory, the controller deletes the position information including an address of the start part of the third broadcast program.

6. The apparatus according to claim 5, wherein the position information is divided and stored for each broadcast program.

7. The apparatus according to claim 5, wherein the apparatus is installed in a TV or a set top box which receives digital broadcasts.

8. The apparatus according to claim 5, wherein the detector detects the change in at least one of said audio or video signals based on a video period of a substantially black screen and an audio period of substantially no sound simultaneously detected for a predetermined time.

9. The apparatus according to claim 5, wherein the first and second programs are received through a same tuner.

* * * * *